United States Patent
Wendl et al.

[19]

[11] Patent Number: 6,032,960
[45] Date of Patent: Mar. 7, 2000

[54] MULTI-LAYERED SEALING ELEMENT

[76] Inventors: Manfred Wendl, Heubergstr. 18, D-83026 Rosenheim, Germany; Josef Gantner, Jäger-von-Fall-Str. 7, D-85662 Hohenbrunn, Germany

[21] Appl. No.: 08/926,014

[22] Filed: Sep. 10, 1997

[30] Foreign Application Priority Data

Jun. 6, 1997 [DE] Germany ............ 197 23 907

[51] Int. Cl.$^7$ ............................................. H02G 15/013
[52] U.S. Cl. ............................................. 277/627
[58] Field of Search ................... 277/627, 606, 277/612, 312

[56] References Cited

U.S. PATENT DOCUMENTS

| | | | |
|---|---|---|---|
| 1,020,115 | 3/1912 | Price | 277/627 |
| 1,734,470 | 11/1929 | Kellogg | 277/606 |
| 2,961,712 | 11/1960 | Davis | 264/131 |
| 3,612,545 | 10/1971 | Storms | 277/582 |
| 3,953,566 | 4/1976 | Gore | 264/288 |
| 4,187,390 | 2/1980 | Gore | 174/102 R |
| 4,360,227 | 11/1982 | Bridges | 285/373 |
| 4,524,982 | 6/1985 | Hertz | 277/322 |
| 4,915,249 | 4/1990 | Anhegger et al. | 220/86.1 |
| 5,281,475 | 1/1994 | Hollenbaugh, Jr. et al. | 428/357 |
| 5,364,699 | 11/1994 | Hollenbaugh, Jr. et al. | 428/357 |
| 5,486,010 | 1/1996 | Hamilton et al. | 277/312 |
| 5,494,301 | 2/1996 | Hamilton et al. | 277/227 |
| 5,551,706 | 9/1996 | Barna et al. | 277/312 |
| 5,607,167 | 3/1997 | Franckx | 277/612 |
| 5,624,227 | 4/1997 | Farrell | 415/139 |

FOREIGN PATENT DOCUMENTS

| | | |
|---|---|---|
| 1113556 | 4/1962 | Germany. |
| 1279322 | 10/1968 | Germany. |
| 238 853 | 12/1925 | United Kingdom. |
| 94/24467 | 10/1994 | WIPO. |
| 96/07842 | 3/1996 | WIPO. |

OTHER PUBLICATIONS

European Search Report EP 97115745 (1 page).

*Primary Examiner*—Anthony Knight
*Assistant Examiner*—Karlena D. Schwing
*Attorney, Agent, or Firm*—Carol A. Lewis White

[57] ABSTRACT

The present invention is directed to a sealing element which comprises at least a spirally rolled, film-like material made of expanded polytetrafluoroethylene (ePTFE), the sealing element over its cord cross-section having a density gradient which increases, starting from the outer side of the sealing element, in the direction towards the center of its cross-section. Furthermore, the present invention provides a sealing element which has a second annular formation which is connected to the first annular formation by means of a flexible-tube-like intermediate region made of the same film-like material. The two annular formations may also be arranged at a predetermined distance from one another.

14 Claims, 13 Drawing Sheets

MULTI-LAYERED SEALING ELEMENT

FIELD OF THE INVENTION

The present invention relates to a continuous, endless sealing element, which is of cord-like design and is suitable in particular for sealing flanges. The invention furthermore relates to a method for producing such a sealing element.

BACKGROUND OF THE INVENTION

It is known to produce toroidal sealing rings, in particular as flange packings, from expanded polytetrafluoroethylene (ePTFE). By way of example, uniaxially oriented, expanded polytetrafluoroethylene is used for the production of seals of this kind. However, known toroidal sealing rings of this kind still leave a considerable amount to be desired in terms of the transverse strength, the creep and the consolidation behavior. Furthermore seals of this kind require closure areas, for example, by means of overlapping. In the case of ePTFE seals which have been oriented only uniaxially, considerable densification of the material occurs owing to transverse flow, as does a considerable degree of creep in the transverse direction.

U.S. Pat. No. 5,281,475 has disclosed a continuous PTFE fibre, for example in the form of a strand, a thread, a rod or a tube, this fibre having a helically rolled self-adhesive, continuous film of PTFE. Furthermore, this fibre has an outer surface which has an essentially round profile and a single, spirally running seam. The continuous PTFE film may be filled with particulate fillers or may be coated with polymeric materials prior to production of the continuous, essentially round PTFE fibre. The continuous PTFE layer may be provided for combining with other elements, for example thread-like elements or film-like elements within the continuous, essentially round PTFE fibre.

"Helically rolled" is in this context understood to mean that the resulting PTFE fibre acquires a spiral structure which is formed by winding the continuous PTFE film around a central longitudinal axis of the fibre in the longitudinal direction of the fibre. The PTFE film used here is in particular a film made of expanded, microporous polytetrafluoroethylene.

A similar PTFE fibre is known from U.S. Pat. No. 5,364,699, it being possible for this like elements, in addition to the layers of the helically rolled, self-adhesive, continuous PTFE film. Thread-like elements of this kind may be, for example, conductive wires, optical fibres or fine tubes.

U.S. patent application Ser. No. 08/050,903, with application date Apr. 20, 1993, furthermore describes a composite sealing material which has a core made of elongate polytetrafluoroethylene and at least one film made of a porous, expanded polytetrafluoroethylene, this film being wound, for example helically, around the core.

Furthermore, U.S. patent application Ser. No. 08/300,018, with application date of Sep. 2, 1994, describes a sealing element which is made from a film of expanded polytetrafluoroethylene which is wound helically to form a packing cord and has a relatively low creep.

Porous, expanded polytetrafluoroethylene (ePTFE) is generally known from U.S. Pat. No. 3,953,566. Porous, expanded polytetrafluoroethylene has a higher strength than the unexpanded form of PTFE, is as chemically inert as conventional PTFE and, when it is used as a sealing element, can be employed in a wide temperature range of up to about 350° C. An example of a sealing material made of porous, expanded polytetrafluoroethylene is GORE-TEX® Joint Sealant, which is produced by W. L. Gore & Associates, Inc., Elkton, Md., USA.

As a consequence of dimensional changes owing to creep, many commercially available PTFE seals require an additional clamping force, which has to be applied to the seal some time after the seal has been installed. This represents an extraordinarily undesirable property for a sealing material. For applications in which it is necessary to maintain a specific height of the seal during use, for functional and safety reasons, it is not possible repeatedly to adjust the clamping force. If such seals are used, for example, as static sealing elements between multiple plates of heat exchangers and frame filters, there is a combined reduction in thickness of the sealing material between the plates owing to creep and, if this is multiplied by the number of plates in the unit, this may result in a considerable reduction in the sealing clamping force, which may lead to substantial leakage problems which cannot be eliminated.

W. L. Gore & Associates, Inc., USA produces a large number of sealing materials which have a core made of a porous, expanded polytetrafluoroethylene which is wound into a strip of expanded polytetrafluoroethylene. A commercially available example of sealing material of this kind is GORE-TEX® sealing material for use in sealing plate heat exchangers. The advantage of a two-stage design of this kind consists in the fact that the winding of a strip of higher strength around the core material tends to counteract the flow of the core material out of its original dimensions (i.e. the wound strip limits transverse expansion of the core under load). Although this material works reasonably well, there nevertheless remains a need for an improved sealing material made of expanded PTFE which withstands creep. FIG. 8 shows, by way of example, a conventional sealing element 30 made of expanded polytetrafluoroethylene (ePTFE). Owing to the tendency of the material of this sealing element 30 to creep when it is subjected to a compression force in the Z-direction over time, the material tends to expand in the Y direction and to a small extent also in the X direction, as a result of which the seal provided by this material is impaired. The resistance to creep is thus provided primarily in the longitudinal or X direction, but optimum functioning of the seal requires there to be resistance to creep in both the longitudinal or X direction and in the transverse or Y direction.

Furthermore, FIG. 23 shows an exemplary embodiment of a packing cord 22, as described in the above-mentioned U.S. patent application Ser. No. 08/300,018 with application date of Sep. 2, 1994, a packing cord 22 of this kind being used as flange packing between two flanges 20 and 21. In this application, the required closure area formed by overlapping has likewise proven disadvantageous in the case of the packing cord.

DE-C 111 35 56 has disclosed an apparatus for producing wound annular bodies from material which is resilient to a certain degree, such as preferably woven fabrics or knitted fabrics which are impregnated with rubber, synthetic resin or the like, films, sheets or layers of rubber, paper or metal, this apparatus having a mandrel over which a reverse-drawing hose is arranged, onto which the material to be wound is applied and, for the purpose of winding the material, the hose is taken off the mandrel by turning it back on itself. In this known apparatus, the reverse-drawing hose which has been pulled onto the mandrel may, for example, be a section of a flexible tube made of rubber or another sufficiently flexible or elastic substance with or without inserts, or alternatively this reverse-drawing hose may also be formed from a plurality of individual strips. The annular bodies which can be produced by means of this known apparatus may, for example, be used as V-belt blanks or as similar endless annular bodies.

SUMMARY OF THE INVENTION

In view of the prior art outlined above, the object underlying the present invention is to provide a sealing element which is distinguished by a substantially reduced transverse flow and a considerably improved consolidation behaviour. When the sealing element is compressed by, for example, screw forces in the case of a flange connection, it is intended that the stress maximum should be concentrated centrally in a compressed portion of the seal over only a small area.

Furthermore, the object underlying the present invention is to provide a method by means of which a continuous endless sealing element, which is distinguished by the absence of closure areas, can be produced in a relatively simple, safe and cost-effective manner.

This object is achieved according to the invention by means of a sealing element which comprises at least a spirally rolled, film-like material made of expanded polytetrafluoroethylene (ePTFE), the sealing element over its cord cross-section having a density gradient which increases, starting from the outer side of the sealing element, in the direction towards the centre of its cross-section. Preferably, the sealing element comprises an annular formation which has an essentially circular cross-section.

Furthermore, the present invention provides a sealing element which has a second annular formation which is connected to the first annular formation by means of a flexible-tube-like intermediate region made of the same film-like material. The two annular formations may also be arranged at a predetermined distance from one another, it being possible for the flexible-tube-like intermediate region additionally to be laminated with a coating material, in particular a reinforcing material. For certain applications, it may be advantageous if the two annular formations directly adjoin one another.

The film material is preferably biaxially oriented polytetrafluoroethylene. A multiaxially oriented PTFE may also be used.

To adapt the sealing element to different applications, it may have a plurality of film-like materials having different properties, it being possible for these properties to be distributed asymmetrically over the thickness of the seal. The asymmetric distribution may, for example, be based on the use of a coated film-like material. Possible coatings are fluoropolymers, such as fluoroethylene-propylene copolymer (FEP) or perfluoroalkoxy (PFA) or elastomers, such as fluoroelastomers. The material may also be filled or impregnated with an elastomer.

The density gradient is preferably selected such that the density at the outer side of the element is about 0.1 g/cm$^3$, which approximately corresponds to the density of the starting material and, in the region of the centre of the cross-section, the density may be at most about 2.2 g/cm$^3$, which approximately corresponds to the density of the solid material.

The method according to the invention for producing a continuous sealing element which is of cord-like design and is of multi-layer structure is distinguished by the following method steps:

a) at least one film-like material (3) made of expanded polytetrafluoroethylene (ePTFE), which initially has a uniform density distribution and a predetermined width, is wound onto an elongate mandrel in the circumferential direction ($Pf_2$) of the said mandrel, until a desired thickness ($d_1$) of a resulting material reel (4) on the circumference of the mandrel (1) is reached;

b) the material reel (4), in the region of one end of the mandrel (1), starting in the direction of the axis (2) of the mandrel (1), is rolled over along the circumference of the mandrel by means of a rolling-over operation acting on the material reel (4) essentially as far as the region of the opposite end of the mandrel (1), so that essentially an annular formation (6) comprising the rolled-over material reel (4) is produced;

c) the annular formation (6) is then subjected on a mandrel to a thermal treatment during which treatment it shrinks such that it acquires a density gradient over the cross-section of the annular formation (6), as a result of which the density of the expanded polytetrafluoroethylene (ePTFE) increases, starting from the outer side of the annular formation (6), towards the centre of its cross-section.

Annular seals are preferably produced by means of the method described. Naturally, however, oval or poly-gonal shapes are also possible. The rolling results initially in an essentially circular cross-section. However, for particular applications this cross-section may also be modified by corresponding deformation and preferably made into a rectangular shape.

The thermal treatment may take place on the same mandrel as that on which the rolling-over operation takes place, but preferably a mandrel of smaller diameter is used, in order to match the material contraction taking place during shrinkage.

For certain applications, it may be sensible to provide a second reel on the mandrel, the film-like material on the mandrel being rolled up in the opposite direction to the second reel, so that a sealing element comprising two annular formations which face one another is formed.

The material of the seal shrinks as a function of the supply of heat during the thermal treatment, leading to a stress concentration in the material and thus causing a compaction. Preferably, a sintering operation is also carried out after the shrinking. The sintering reinforces the material structure achieved. The duration of the thermal treatment is between 1 minute and 2 hours, preferably in the range from 3 minutes to 40 minutes.

If the annular formation is transferred onto a smaller mandrel prior to the thermal treatment, the diameter of the smaller mandrel is preferably selected such that it coincides with the degree of shrinkage of the film material, so that, after shrinkage, the internal diameter of the annular formation corresponds to the diameter of the mandrel.

For certain intended applications, it may be advantageous not to wind the two material reels on the mandrel so far towards one another that they contact one another, but rather to leave them in a position in which they are at a certain distance from one another. The flexible-tube-like intermediate region may additionally be laminated, prior to the thermal treatment, with a coating material, in particular reinforcing material, and only then heat-treated.

For certain intended applications, the two material reels may also be made such that the two annular formations acquire different thicknesses. In addition, it is possible to transfer only one of the two annular formations onto a mandrel of smaller diameter, so that during shrinkage only this formation assumes a smaller diameter, as a result of which a sealing element which is of essentially double-annular design is produced in a conical configuration.

The supply of heat for shrinking is effected either via a heated mandrel, the mandrel then preferably being heated to a temperature in the range between about 327° C. and 420° C. However, the supply of heat may also be carried out by convection and/or radiation, for example in a convection oven.

In order to achieve an asymmetric distribution of the material properties over the thickness of the resulting annular formation, it is possible to wind a plurality of film-like material webs, in particular having different properties and of in each case predetermined width in the direction of the axis of the mandrel, successively onto the mandrel, the material webs at least partially overlapping one another.

In order to impart a thickness which is as uniform as possible to the annular formation, the film-like material to be wound is provided with an obliquely cut starting edge and with an obliquely cut end edge, in order, in the course of the winding process, to produce starting and end regions, which in each case run helically, of the resulting material reel.

The shape of the mandrel is essentially cylindrical, but it is also possible to use slightly conical profiles. It has also proven advantageous for the sealing element to be subjected to further expansion following the shrinking or sintering.

Furthermore, the method according to the invention also makes it possible, during the rolling-over process for forming the essentially annular formation or the two essentially annular formations on the mandrel, additionally to roll in one or more tubular elements, in particular wires, coil springs, O-rings or the like as core or cores (for example of elastic solid round or tubular cross-section). Consequently, essentially annular components, for example sealing rings, can be produced with a tubular core.

Furthermore, the diameter of the essentially annular formation or of the two essentially annular formations can advantageously be adjusted as a function of the thickness $d_1$ of the material reel and/or of the width h of the material reel and/or of the diameter $D_1$ of the material reel.

In accordance with a further advantageous configuration of the method, an essentially cylindrical body, in particular pipe section, or, as an alternative, an essentially conical body, in particular pipe section, can be used as the mandrel. It is thus possible, for example, to use a pipe section which increases or decreases conically in the direction of winding of the mandrel, so that, for example, stresses in the resulting, essentially annular component can be controlled.

Finally, in the course of the production method according to the invention, it can also be provided for the resulting component, which is of essentially annular or double-annular design, to be subjected to a further expansion after being removed from the mandrel, in order to achieve improved strength properties. For example, the annular or double-annular component may be transferred onto a mandrel with, for example, a variable diameter and subjected to appropriate conditions to expand the circumference of the component. As a result, it is possible, in particular, to produce an increased tensile strength in the X direction. Reference is made to U.S. Pat. Nos. 3,953,566 and 4,187,390 with regard to the expansion of polytetrafluoroethylene.

The method according to the invention in particular has the following advantages:

It is possible to produce essentially annular or double-annular sealing elements with a density gradient over the respective ring cross-section of the sealing elements, this density gradient ensuring that the stress maximum, which stems from screw forces, for example a flange packing, of the seal is concentrated centrally in the compressed seal cross-section over a small area (when the flange surface with compressed sealing element is viewed orthogonally from above), and thus results in high surface pressures at low screw forces. A density gradient of this kind is extremely advantageous in particular for a seal made of microporous material, since the leakage behaviour is decisively dependent on the initial compression (generally greater than 20 MPa) and consequently on the density of the expanded polytetrafluoroethylene (ePTFE).

The film-like material which is present in the sealing element produced according to the method of the invention, in the form of a biaxially oriented, expanded polytetrafluoroethylene membrane, under the action of heat seeks to shrink counter to the original orientation direction. Owing to the envisaged thermal treatment, this material will seek to shrink both in the direction which is tangential with respect to the circumference of the corresponding annular formation (corresponds to the machine direction of the membrane and the circumferential direction of the mandrel) and in the direction which is tangential with respect to the cross-sectional circumference of the annular formation (corresponds to the transverse direction of the membrane). Since the essentially annular formation is wound spirally into itself, this shrinkage force continues uninterrupted in a spiral manner from the outside to the inside over the cross-section of the ring. Since, when considered separately, these shrinkage forces, which are tangential with respect to the cross-sectional circumference of the annular formation, act tangentially on a spiral segment, they lead to forces which are distributed over the circumference, are directed towards the centre of the cross-section and increase integrally with the number of layers of the film-like material, calculated from the outside, and thus with decreasing distance from the centre of the cross-section. These resulting forces directed towards the centre of the cross-section effect the density gradient which is provided according to the invention and runs inwards from the outside.

It is possible to produce biaxially oriented sealing rings with a substantially reduced transverse flow and a considerably increased consolidation behaviour. Owing to the matrix tensile strength, which is still present even after shrinking, of the material in the circumferential direction of the cross-section, a transverse flow of the sealing element is prevented or reduced, which additionally to the mechanism described above promotes the concentration of the stress on the centre axis of the area, stemming from the mass distribution in the circular cross-section (more mass remains in the centre, which when compressed to the same height leads to a locally higher density in the centre).

It is possible to produce endless sealing rings with virtually any desired diameters (both flange and cross-sectional diameters);

A large strip width of cross-sectional diameters of the resulting, essentially annular component is achieved (as a function of the thickness and the number of turns of the material used, in particular a membrane made of biaxially oriented ePTFE);

A tubular core is simultaneously rolled into the essentially annular component;

Relatively thin monofilament rings are produced, owing to a further orientation following the production of the essentially annular component;

It is possible to produce sealing rings with a composite structure (ePTFE/polymer film laminates as functional layers);

Closure areas resulting from overlapping, and therefore weak points in the resulting sealing element, are avoided.

The method according to the invention can be used, for example, to produce static sealing rings, face seals, rotary shaft seals, but furthermore also to produce electrical capacitors and the like.

BRIEF DESCRIPTION OF THE DRAWINGS

The present invention will now be explained in more detail in the context of exemplary embodiments, with reference to the appended drawings, in which.

DETAILED DESCRIPTION OF THE INVENTION

Figure 1:
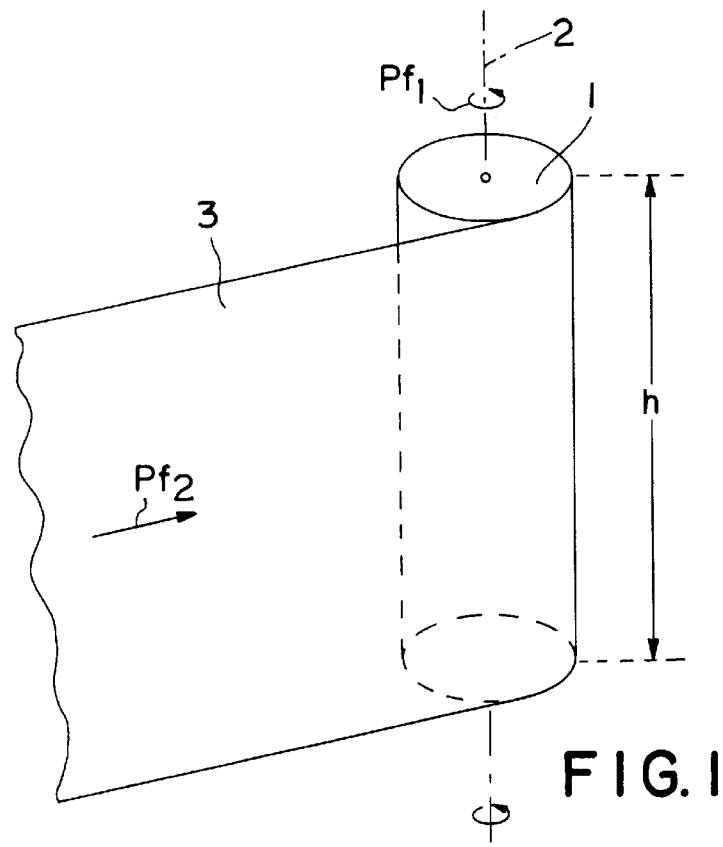
FIG. 1 diagrammatically shows a perspective view of an essentially cylindrical mandrel, onto the circumference of which a film-like material is being wound in accordance with a first embodiment.

In accordance with FIG. 1, for example in order to produce a sealing element which is of essentially annular design and has a multi-layer structure, firstly a film-like material 3, in the form of a membrane made of a biaxially oriented, expanded polytetrafluoroethylene (ePTFE), with a predetermined width h is wound onto an essentially cylindrical mandrel 1 in the direction of the arrow $Pf_2$. The mandrel 1 has an axis of rotation 2, the direction of rotation being indicated by an arrow $Pf_1$.

Figure 2:
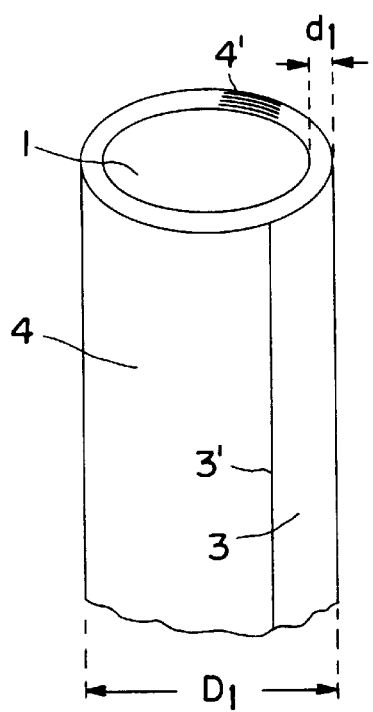
FIG. 2 shows a perspective partial view of the resulting material reel on the mandrel in accordance with FIG. 1.

The film-like material 3 (membrane) is wound continuously onto the circumference of the mandrel 1 until a desired thickness $d_1$ of a material reel 4 is reached, as can be seen from FIG. 2. The winding operation is then interrupted, the outer end of the material reel 4 being formed by a straight-cut outer edge 3' of the annular material 3. The layers of the resulting material reel 4 are denoted by 4', which layers are formed by the wound film-like material and lie one above the other.

Figure 3:
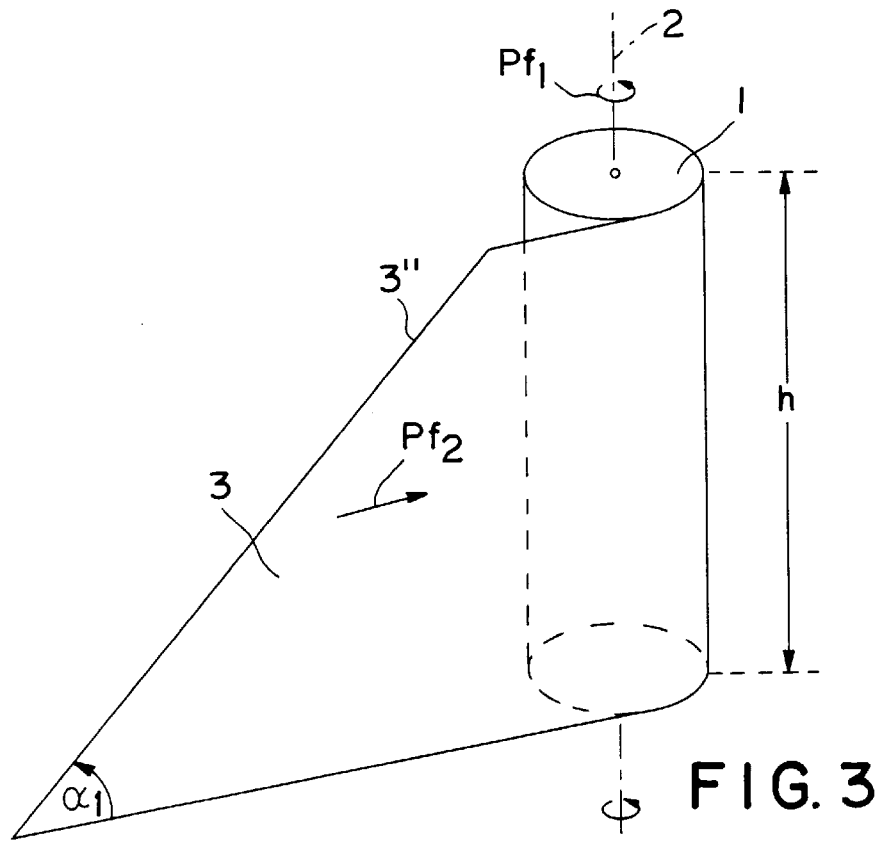
FIG. 3 diagrammatically shows a perspective view of an essentially cylindrical mandrel, onto the circumference of which a film-like material is being wound in accordance with a second embodiment.
Figure 19:
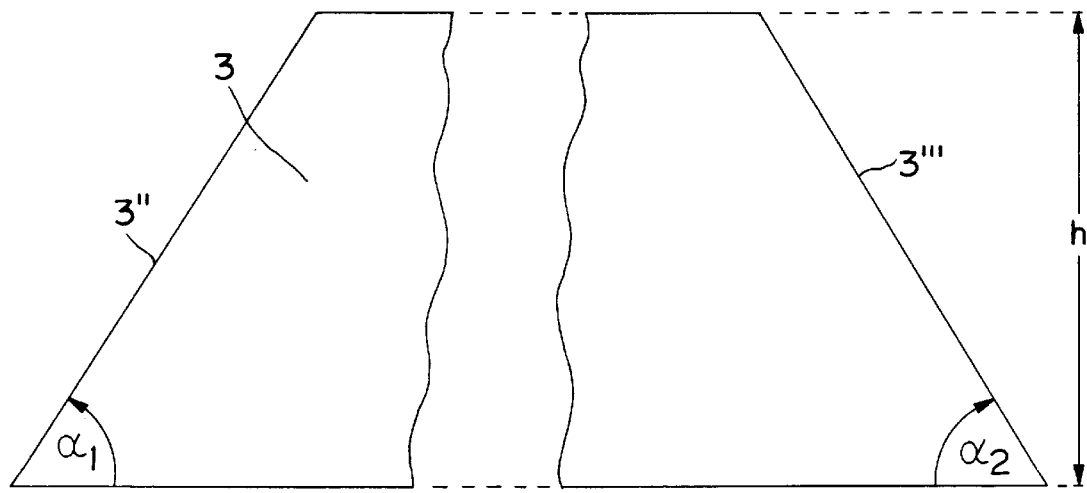
FIG. 19 diagrammatically shows a partial sectional view of an elongate film-like material web, which is wound onto a mandrel in accordance with FIG. 3.

FIG. 3 shows an embodiment which is modified with respect to FIG. 1 insofar as the film-like material 3 is now provided with an obliquely cut end edge 3". FIG. 19 diagrammatically shows a partial side view of a completely opened up, film-like material 3, from which it can be seen that the film-like material 3 has both an obliquely cut starting edge 3''', by means of which the beginning of the material is first wound onto the mandrel 1, and the above-mentioned obliquely cut end edge 3" at the outer end of the material 3. The angle formed by the obliquely cut end edge 3" is denoted by $\alpha_1$ and the angle formed by the obliquely cut starting edge 3''' is denoted by $\alpha_2$, it being true that:

$$\alpha_1 = \alpha_2 = \arctan\frac{h}{nD_1\pi};$$

n=number of rotations.

These obliquely cut end and starting edges 3", 3'" of the film-like material 3 ensure that an essentially uniform material reel 4 is produced on the mandrel, so that, during the rolling-over operation to form the resulting annular formation, there is no thickening on one side of this formation.

FIG. 4 again shows the material reel 4, which is formed on the mandrel 1 and is produced on the basis of the winding process in accordance with FIG. 3.

Figure 4:
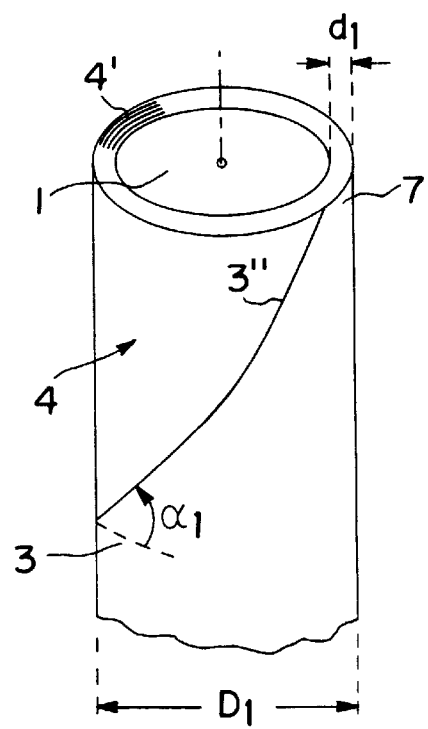
FIG. 4 shows a perspective partial view of the resulting material reel on the mandrel in accordance with FIG. 3.

The material reel 4 produced on the mandrel 1 in accordance with FIG. 2 or 4 in each case has a diameter $D_1$.

Figure 5:
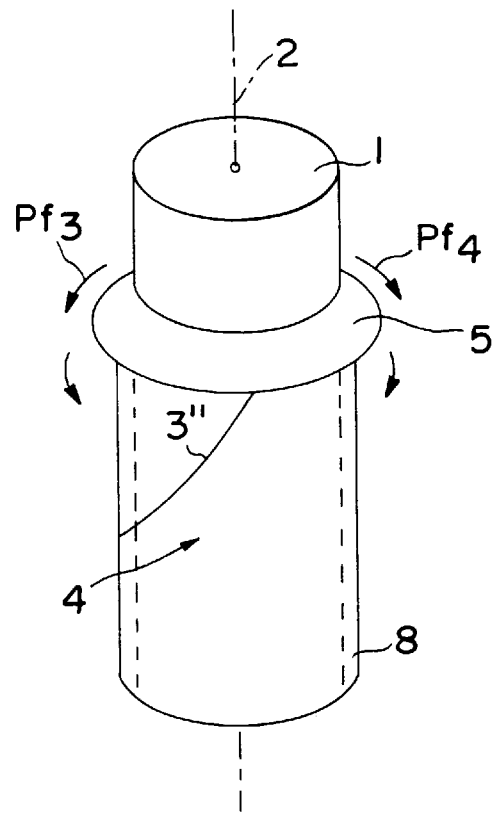
FIG. 5 shows a diagrammatic, perspective view of the mandrel, with the material reel situated thereon, in accordance with FIG. 4, where a ring is being produced from this material reel by means of an ongoing rolling-over operation, which acts on the said reel, in the axial direction of the mandrel.

Following the winding process explained with reference to FIGS. 1 and 2 or 3 and 4, the material reel 4, starting at one end of the mandrel 1 (in the present exemplary embodiment starting at the upper end), in the direction of the axis 2 of the mandrel 1, is rolled over along the circumference of the mandrel by successively rolling over the material reel 4, as indicated by the arrows $Pf_3$ and $Pf_4$, essentially as far as the opposite end of the mandrel 1, as shown in FIG. 5. In accordance with FIG. 4, the first (upper) end of the material reel 4 is denoted by 7, and in accordance with FIG. 5 the second (lower) end of the material reel 4 is denoted by 8.

FIG. 5 shows an intermediate stage of this rolling-over operation, a temporary annular formation 5 initially being formed on the surface of the mandrel 1.

Figure 6:
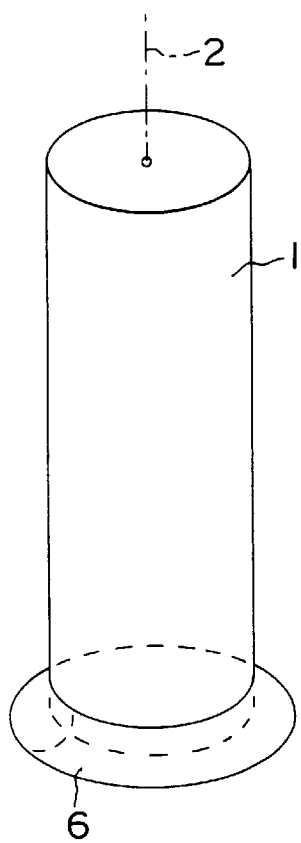
FIG. 6 shows a view corresponding to FIG. 5 with the material reel now completely rolled over to form a finished ring.

Further successive, continuous rolling-over and stripping off in the direction towards the lower end of the mandrel 1 leads to the creation of a resulting annular formation 6 from the rolled-over material reel 4, as can now be seen from FIG. 6.

This annular formation 6 is then subjected, on the mandrel 1, to a thermal treatment, with a predetermined duration, such that the expanded polytetrafluoroethylene (ePTFE) acquires a density gradient over the cross-section of the annular formation 6, as a result of which the density of the ePTFE increases, starting from the outer side of the annular formation 6, in the direction towards the centre of its cross-section.

It is explained with reference to FIG. 24 that, in particular in order to achieve the desired density gradient over the cross-section 15 of the annular formation 6, the thermal treatment is carried out in such a manner that the resulting density in the region of the essentially cylindrical outer side of the annular formation 6 is slightly higher than the initial density of the film-like material from which the annular formation 6 is made, and the resulting density in the region of the centre of the cross-section 15 is approximately equal to the specific density of fully compacted ePTFE. In particular, a thermal treatment for shrinking the film-like material in the annular formation 6 is carried out in the temperature range from about 90° C. to about 320° C. and a subsequent thermal treatment for sintering is carried out in the temperature range from about 327° C. to about 420° C. On the other hand, these shrinking and sintering processes can be carried out in an overlapping fashion purely in the sintering temperature range. The treatment durations and residence times are very much dependent on the cross-sectional diameters and are preferably in the range from 3 minutes to 40 minutes.

As a result, for example, the density in the region of the outer side of the annular formation 6 is about 0.1 g/cm³ and in the region of the centre of the cross-section of the annular formation 6 is at most about 2.2 g/cm³.

Figure 25:
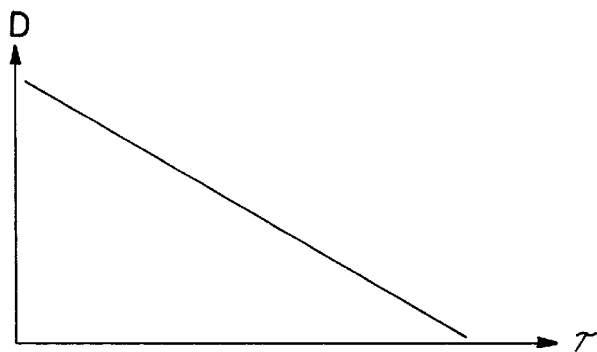
FIG. 25 shows a graph in order to illustrate the density gradient over the circular cross-section of the annular sealing element in accordance with FIG. 24.

FIG. 25 shows a graph of the relative density gradient, with the density D plotted against the radius r of the circular cross-section 15 of the annular formation 6. In the present example, the density gradient has a constant progression, starting from the centre of the cross-section 15, in the direction towards the circumference thereof, that is to say the outer side of the annular formation 6. In this case, by way of example, the density at the outer side is about 0.1 g/cm³ and in the region of the centre of the cross-section 15 is at most about 2.2 g/cm³.

The resulting annular formation 6 is removed from the mandrel 1 following the thermal treatment which has been explained.

Figure 7C:
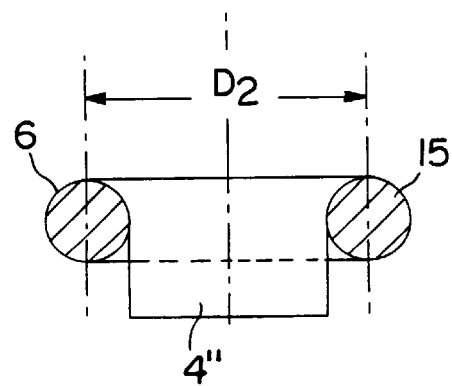
FIG. 7C diagrammatically shows a view of an axial section through a further embodiment of a component which is of essentially annular design.
Figure 7A:
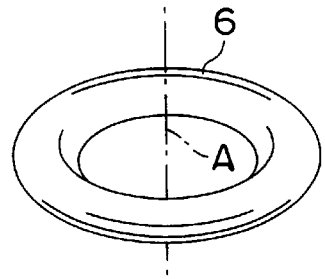
FIG. 7A diagrammatically shows a perspective view of the finished ring which has been removed from the mandrel.

FIG. 7A shows a perspective view of the finished, annular sealing element 6 of multi-layer structure.

The diameter $D_2$ of the resulting annular formation 6 (cf. FIG. 7B) is dependent on the width h of the material reel 4 on the mandrel and on the thickness $d_1$ of the reel (cf. FIG. 2–4).

Figure 7D:
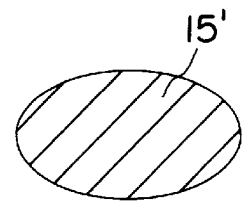
FIG. 7D diagrammatically shows a cross-section of another embodiment of an annular formation.
Figure 7B:
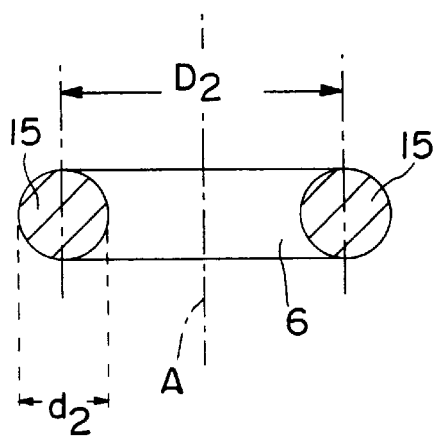
FIG. 7B diagrammatically shows a view of an axial section through the finished ring.
Figure 7E:
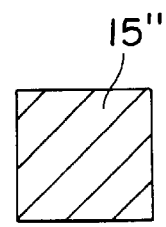
FIG. 7E diagrammatically shows a cross-section of a further embodiment of an annular formation.
Figure 8:
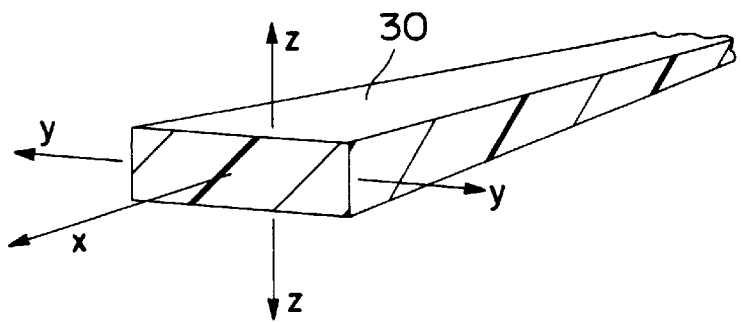
FIG. 8 diagrammaticaly shows a perspective partial view of a conventional sealing element.

In FIG. 7B, the essentially circular cross-section of the resulting annular formation 6 is denoted by 15, $d_2$ indicating the diameter of this cross-section 15 and thus the thickness of the resulting annular formation 6. The centre axis of the annular formation 6 is denoted by A. It can be seen from FIG. 7D that the annular formation 6 in accordance with FIG. 7B may have an essentially oval cross-section 15' or, in accordance with FIG. 7E, an essentially rectangular cross-section 15", instead of an essentially circular cross-section 15. An essentially oval cross-section 15' of this kind, or an essentially rectangular cross-section 15" of this kind, of the formation 6 is produced by corresponding compression-moulding of the said formation following the winding, rolling-over, shrinking and/or sintering processes.

FIG. 7C shows an embodiment of a resulting annular formation 6 which is modified by comparison with FIG. 7B insofar as a free end portion 4" of the original material reel 4 is now left on the said formation. Such a free end portion 4" of the material reel 4 may, if desired, assume a further sealing function.

Figure 9:
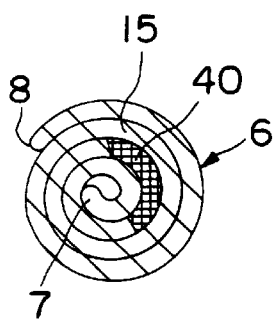
FIG. 9 shows a view of an axial section, corresponding to FIG. 7h, in order to illustrate more precisely the cross-section of the resulting annular formation.
Figure 10:
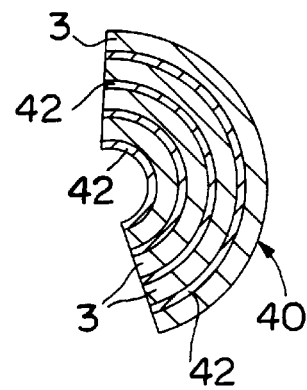
FIG. 10 shows a view of a detail of the cross-section illustrated in FIG. 9, in accordance with a first embodiment.
Figure 11:
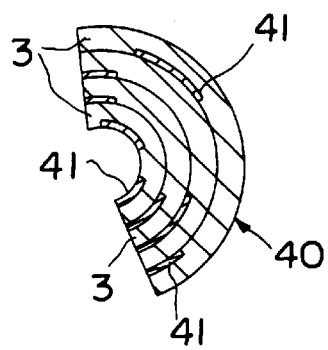
FIG. 11 shows a view corresponding to FIG. 10, in accordance with a second embodiment.

FIG. 9 shows a detailed view of the cross-section 15 of the annular formation 6 produced from the rolled-over material reel 4, 7 denoting the first (inner) end of the material reel 4 and 8 the second (outer) end of the material reel 4. As already explained above, the material reel 4 comprises a number of superimposed reel layers 4", which are formed from the film-like material 3. A single portion of the rolled-over material reel 4 is denoted by 40 in the cross-section 15 in accordance with FIG. 9. By way of example, FIG. 10 shows an enlarged illustration of this isolated portion 40, from which it can be recognized that a continuous layer 42 of a polymeric material is in each case embedded between the individual layers of the film-like material 3, resulting in a kind of composite structure. It can be seen from FIG. 11 that instead of continuous layers of polymeric material individual isolated strips 41 of polymeric material are now inserted between the individual layers of the film-like material 3. The layer 42 in accordance with FIG. 10 or the strips 41 in accordance with FIG. 11 are either applied to the film-like material 3 prior to the winding process in accordance with method step a) or are allowed to run in during the winding onto the mandrel 1.

Figure 12:
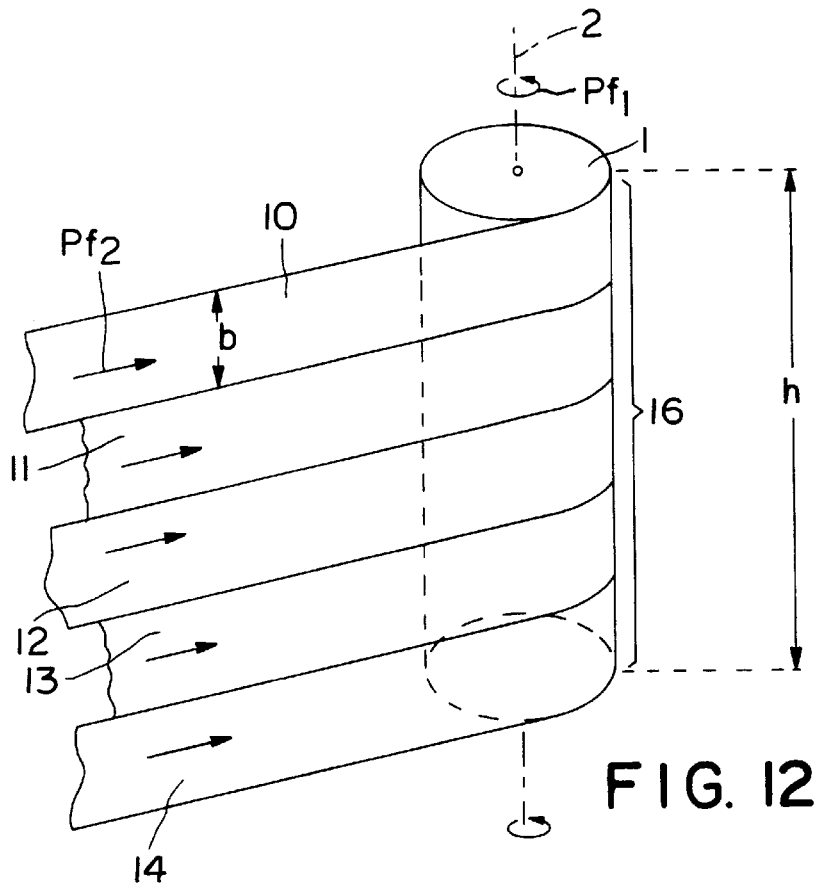
FIG. 12 shows a view corresponding to FIG. 1, in order to illustrate a further configuration of the method.
Figure 13:
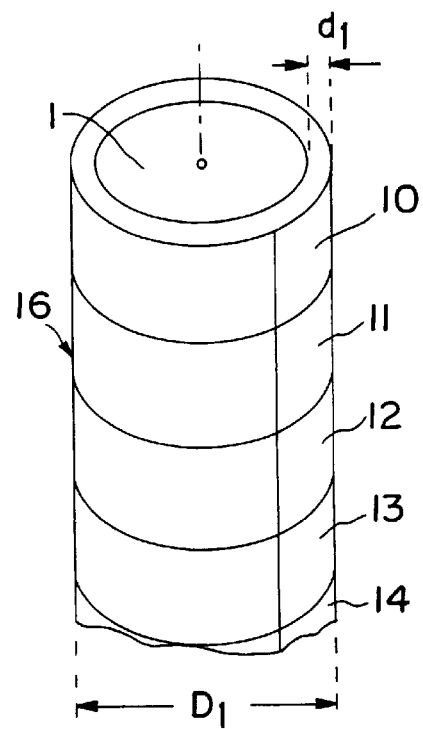
FIG. 13 shows a view corresponding to FIG. 2, in order to illustrate a material reel as produced in the course of the method configuration in accordance with FIG. 12.
Figure 14:
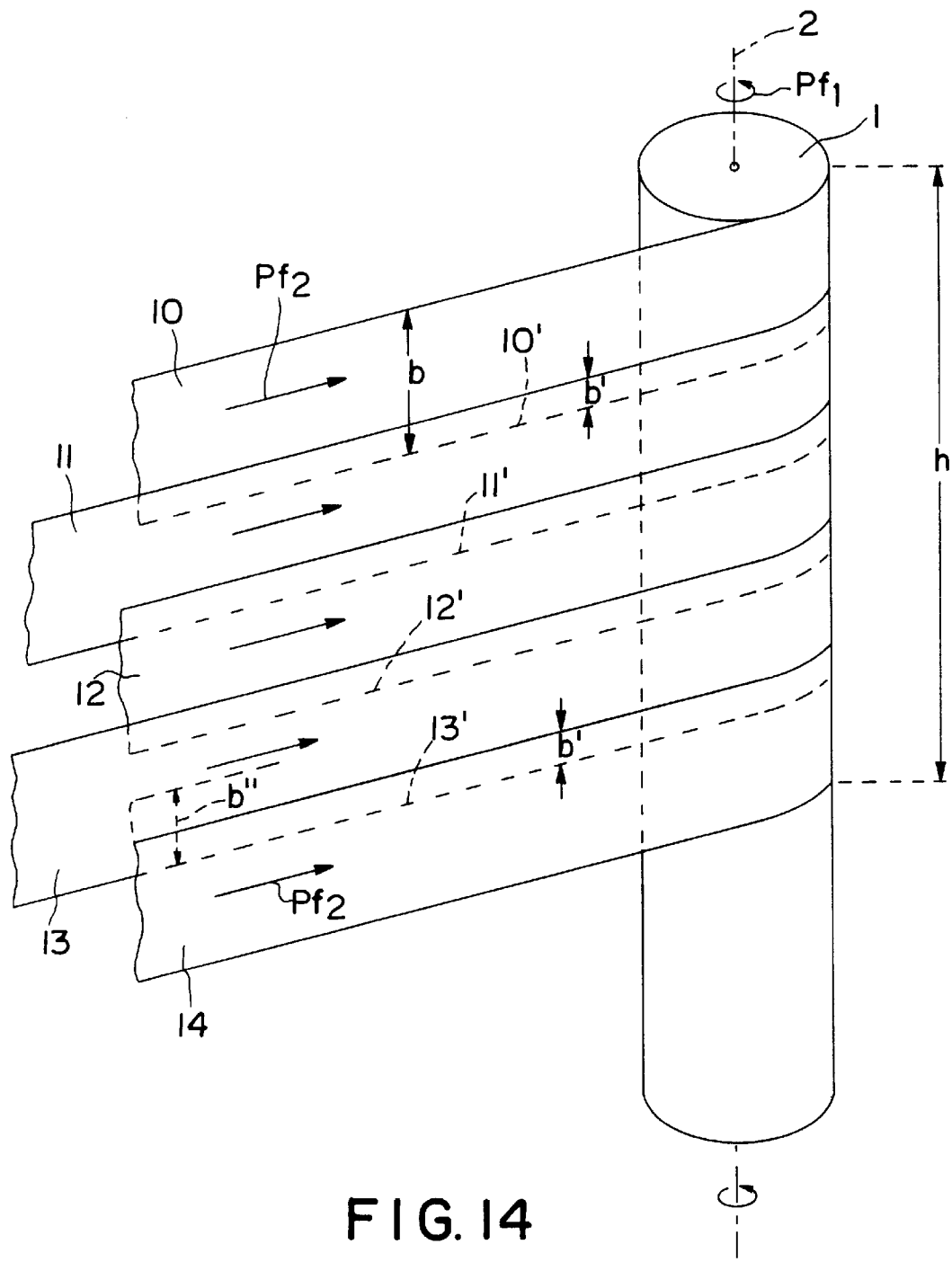
FIG. 14 shows a view corresponding to FIG. 12, in order to illustrate a modified embodiment.

A further advantageous configuration of the method according to the invention is explained with reference to FIGS. 12 and 13. In this case, provision is made for a plurality of film-like material webs 10, 11, 12, 13 and 14 having different material properties and in each case having a predetermined width b to be wound parallel next to one another onto a mandrel 1 in the form of a cylindrical pipe section, so that a resulting material reel 16 with a thickness $d_1$ and a width h is produced. In this case, it is preferred for the material webs 10 to 14 to be wound onto the mandrel 1 so that they are at least partially overlapping, as can be seen from FIG. 14. In particular, these material webs 10 to 14 can be wound onto the mandrel 1 with a predetermined, constant overlap width b', the overlapped region of the material web 10 being denoted by 10', the overlapped region of the material web 11 by 11', the overlapped region of the material web 12 by 12' and the overlapped region of the material web 13 by 13'. These overlapped regions are placed such that the overlapped region 10' is the innermost overlapped region and ultimately the overlapped region 13' is the outermost overlapped region.

The overlap width may vary, for example a relatively large overlap width b" is schematically illustrated between the material webs 13 and 14.

Figure 15:
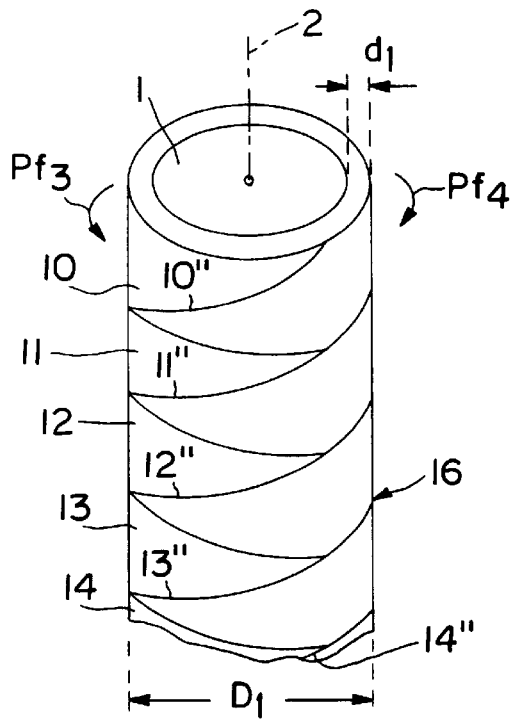
FIG. 15 shows a view corresponding to FIG. 13, in order to illustrate a modified embodiment.

FIG. 15 shows the finished material reel 16 on the mandrel 1, before the rolling-over process in accordance with the arrows $Pf_3$ and $Pf_4$ begins, as already explained with reference to FIG. 5.

It can also be seen from FIG. 15 that the first material web 10 has an obliquely cut end edge 10", the second material web 11 has an obliquely cut end edge 11', the third material web 12 has an obliquely cut end edge 12" and the fourth material web 13 has an obliquely cut end edge 13", and finally the fifth material web 14 has an obliquely cut end edge 14".

For example, the following different material webs 10–14 can be wound onto the mandrel 1, as described above:

material web 10 is a high-strength, biaxially oriented ePTFE membrane (for example having a thickness of 10 to 20 $\mu$), material web 11 is a large-pored membrane, material web 12 is an electroplated membrane, e.g. a copper-coated membrane, material web 13 is an FEP-coated membrane, material web 14 is a high-strength, biaxially oriented ePTFE membrane (for example having a thickness of 10 to 20 $\mu$).

In the present exemplary embodiment in accordance with FIGS. 12–15, a total of 15 membrane webs 10–14 are shown, but it is also possible to wind more or fewer membrane webs onto the mandrel 1 in the manner explained.

Figure 22:
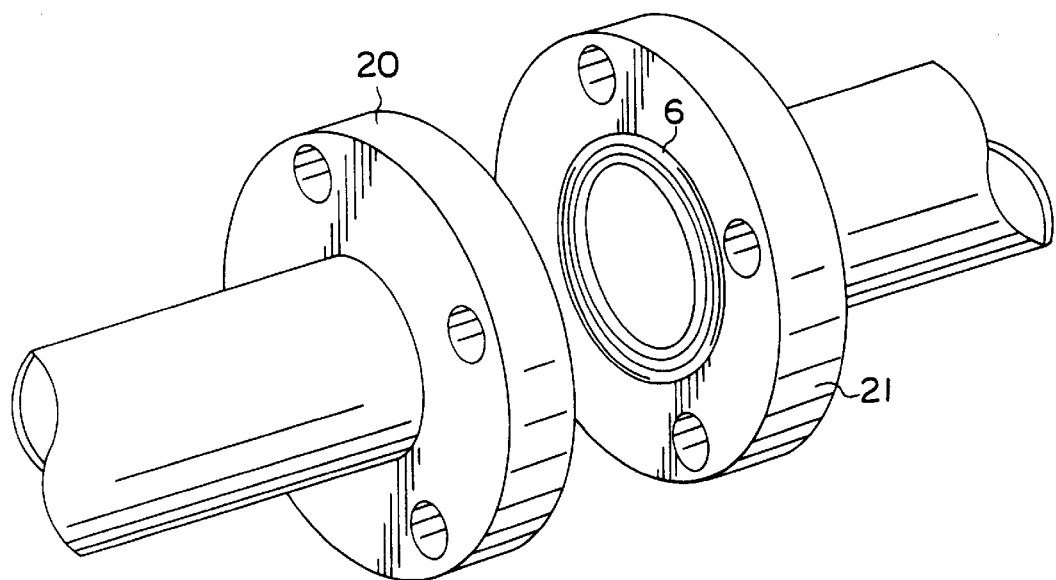
FIG. 22 diagrammatically shows the use of a sealing element formed according to the invention as a flange packing.
Figure 23:
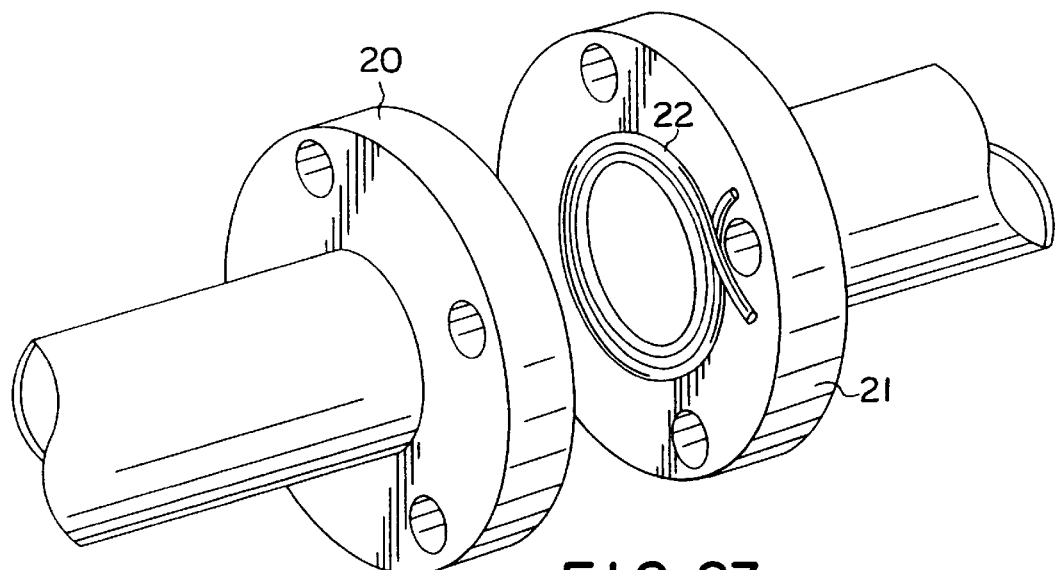
FIG. 23 diagrammatically shows the use of a known colloidal sealing ring as a flange packing.

The resulting material reel 16 is then again rolled as explained above with reference to FIGS. 5 and 6 and is then subjected to a thermal treatment (shrinking, sintering), until ultimately a ring 6 in accordance with FIG. 7A and FIG. 7B is again formed, for example an endless sealing ring having a density gradient over the ring cross-section 15 for use as a flange packing, for example in the arrangement in accordance with FIG. 22.

The above-mentioned use of a plurality of overlapping material web layers produces the advantage that ultimately relatively large resulting diameters of the cross-section of the ring produced are achieved (cf. diameter $d_2$ of the cross-section 15 in accordance with FIG. 7B).

Figure 16:
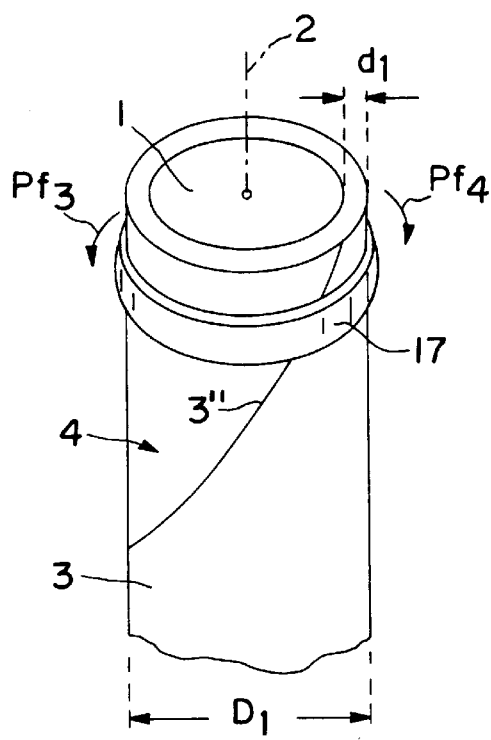
FIG. 16 shows a view corresponding to FIG. 4, in order to illustrate a modified embodiment.

It can be seen from FIG. 16 that a tubular element 17, for example an O-ring, is arranged on the material reel 4, which element is rolled in as a core during the rolling-over process to form an essentially annular formation 6.

Figure 17:
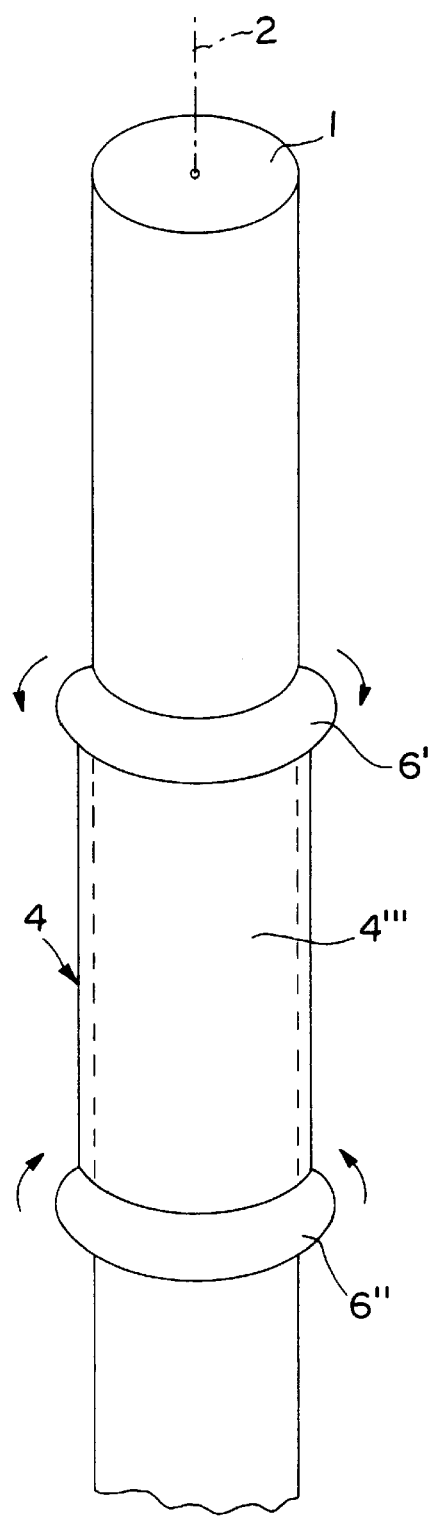
FIG. 17 shows a diagrammatic, perspective view of a mandrel with a material reel situated thereon, from which a first annular formation and a second annular formation are produced by two oppositely directed rolling-over operations in the axial direction of the mandrel.

FIG. 17 shows an exemplary embodiment of a component which is of essentially double-annular design and is produced by the material reel 4 on the circumference of the mandrel 1 being rolled over, initially starting in the region of one end of the mandrel, in the direction of the axis 2 of the mandrel 1, along the circumference of the mandrel by means of a rolling-over operation, which acts on the material reel, essentially as far as a predetermined first circumferential region of the mandrel, so that essentially a first annular formation 6' is produced from the rolled-over material reel 4. The material reel 4 is then rolled, starting in the region of the opposite end of the mandrel 1, in the direction of the axis 2 of the mandrel, but now in the opposite direction, so to speak, along the circumference of the mandrel by means of a further rolling-over operation, which acts on the material reel 4, essentially as far as a predetermined second circumferential region of the mandrel, so that essentially a second annular formation 6" is produced from the rolled-over material reel 4. The first predetermined circumferential region of the mandrel and the second predetermined circumferential region of the mandrel 1 are spaced apart from one another in such a manner that the first annular formation 6" and the second annular formation 6' are at a corresponding distance from one another and remain connected to one another by means of a flexible-tube-like intermediate region 4''' of the material reel 4.

The first annular formation 6' and the second annular formation 6" on the mandrel 1 are then subjected to a thermal treatment, with a predetermined duration, such that the expanded polytetrafluoroethylene (ePTFE) acquires a density gradient over the respective cross-section of the first annular formation 6' or of the second annular formation 6", as a result of which the density of the expanded polytetrafluoroethylene increases, starting from the outer side of the corresponding first annular formation 6' or of the corresponding second annular formation 6", in the direction towards the respective centre of the cross-section of the formation 6' or 6".

Figure 18:
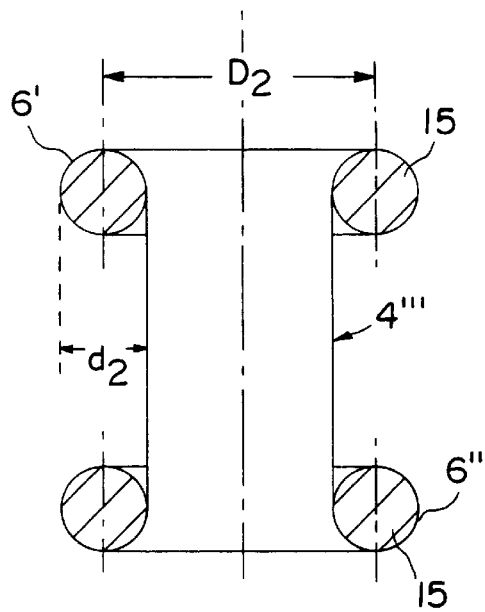
FIG. 18 diagrammatically shows a view of an axial section through the component of double-annular design produced in accordance with FIG. 17.
Figure 24:
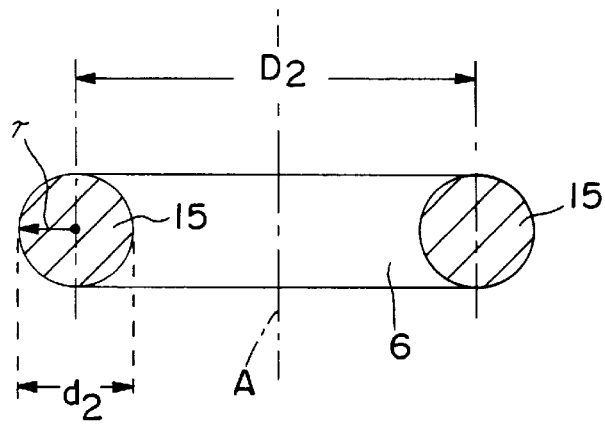
FIG. 24 shows a further view of an axial section through a finished annular sealing element.

This thermal treatment of the two annular formations 6' and 6", which in accordance with the arrangement which can be seen in FIG. 18 are connected together by means of the flexible-tube-like intermediate region 4''', is carried out in a manner corresponding to that already explained in detail above on the basis of FIG. 24 with reference to the annular formation 6.

Consequently, a density gradient profile like that which can be seen from the graph of FIG. 25 is in turn produced both for the annular formation 6' and for the annular formation 6".

Figure 20:
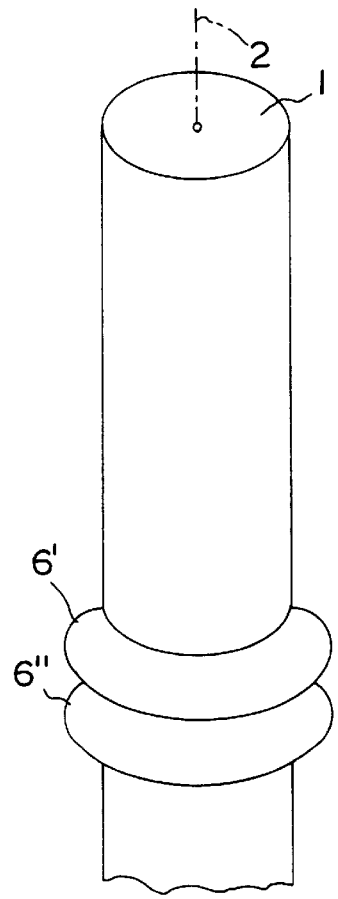
FIG. 20 diagrammatically shows a perspective view of a mandrel, on the circumference of which a first annular formation and a second annular formation directly face one another.
Figure 21:
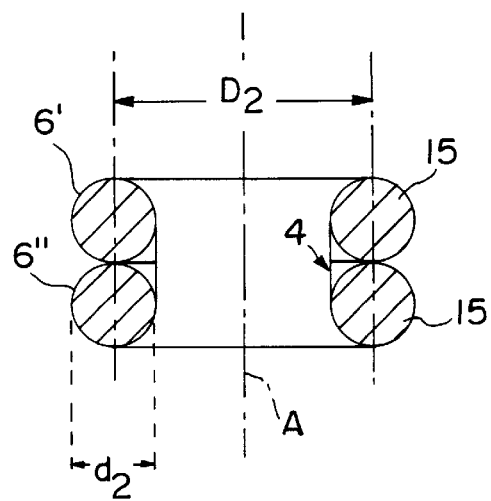
FIG. 21 diagrammatically shows a view of an axial section through a component of double-annular design produced in accordance with FIG. 20.

FIG. 20 shows an embodiment which is modified by comparison to FIG. 17 insofar as the two rolling-over operations, which act on the material reel 4 and start from mutually opposite ends of the mandrel 1, are now carried out until the resulting first annular formation 6' and the resulting second annular formation 6" directly face one another on the circumference of the mandrel 1. In this configuration, the two resulting annular formations 6' and 6" are firstly shrunk and sintered to achieve a density gradient over the respective ring cross-section, as already explained above with reference to FIG. 17, and are then removed from the mandrel 1, it being possible in FIG. 21 to see a view of an axial section of this component of double-annular design. The two annular formations 6' and 6" are still internally connected together by a small piece of the material reel 4.

Figure 26:
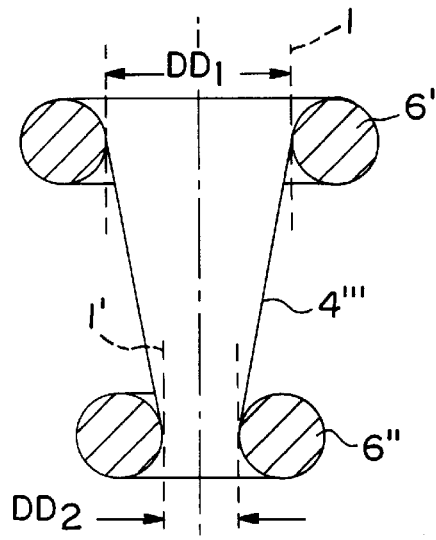
FIG. 26 diagrammatically shows a view of an axial section through a sealing element of double-annular design in an essentially conical overall configuration.

FIG. 26 shows a view of an axial section of a further exemplary embodiment of a sealing element of essentially double-annular design which overall has an essentially conical configuration. This double-annular sealing element is produced in such a manner that firstly a sealing element of double-annular design is made, as already explained above with reference to FIGS. 17 and 18. FIG. 18 shows a view of an axial section of a sealing element of double-annular design in an essentially cylindrical configuration. In order to progress to the conical configuration in accordance with FIG. 26, the following method is employed:

The first annular formation 6' remains on the mandrel 1 having the diameter $DD_1$, while the second annular formation 6" is removed from the mandrel 1 and transferred to a second mandrel 1', which has a smaller diameter $DD_2$ compared to the original mandrel 1. The first annular formation 6' and the second annular formation 6" in this case, as previously in the case of FIG. 18, are at a corresponding distance from one another and remain connected to one another by means of the flexible-tube-like intermediate piece 4'". In FIG. 26, the original mandrel 1 and the second mandrel 1' of smaller diameter are drawn in dashed lines, because FIG. 26 shows the resulting sealing element which is of double-annular design and has already been removed from the respective mandrels 1 and 1'.

Firstly, however, the arrangement explained above, in accordance with which the first annular formation 6' is situated on the mandrel 1 and the second annular formation 6" is situated on the second mandrel 1', is subjected to a thermal treatment with a predetermined or selectable duration, with the object of imparting a density gradient to the expanded polytetrafluoroethylene (ePTFE) over the respective cross-section of the first annular formation 6' or of the second annular formation 6", as a result of which the density of the ePTFE increases, starting from the outer side of the corresponding first annular formation 6' or of the corresponding second annular formation 6", in the direction towards the respective centre of the cross-section of the formation 6' or 6". It should simultaneously be ensured that the ratio of the diameter $DD_1$ of the original mandrel 1 to the diameter $DD_2$ of the second mandrel 1' is set such that the film-like material in the annular formation 6" shrinks such that the latter assumes the diameter $DD_2$ of the second mandrel 1' as its internal diameter, while the annular formation 6' retains the diameter $DD_1$ of the first, original mandrel 1 as its internal diameter. This measure results in the essentially conical overall configuration of the resulting sealing element of double-annular design in accordance with FIG. 26. This conicity in practice becomes clear owing to the flexible-tube-like intermediate region 4'", which is likewise at least sintered in the course of the thermal treatment.

Particularly in the case of the arrangement in accordance with FIG. 26, it is further provided for the ratio of the diameter $DD_1$ of the original mandrel 1 to the diameter $DD_2$ of the second mandrel 1', as a function of the draw ratio of the film-like material 3 contained in the formations 6' and 6" in the circumferential direction (cf. above explanation with reference to FIGS. 1 and 2) to be about 1.7:1, so that shrinkage of the corresponding film-like material of at most 70% is achieved. The thermal treatment of the arrangement in accordance with FIG. 26 is preferably carried out in a convection oven (not shown), which is preheated to about 420° C. (corresponding to 385° C. in the centre of the convection oven), the treatment duration or residence time of the arrangement in accordance with FIG. 26 in the convection oven at the given temperature of 385° C. being set, with a view to the desired shrinkage and sintering result, to about 30 minutes. Consequently, the desired density gradient is achieved over the respective ring cross-section of the first annular formation 6' or of the second annular formation 6" of the arrangement in accordance with FIG. 26, in accordance with which density gradient the density of the ePTFE in the region of the outer side of the respective annular formation 6' or 6" is about 0.1 g/cm$^3$ and in the region of the centre of the cross-section of the respective annular formation 6' or 6" is at most about 2.2 g/cm$^3$.

It can be seen from FIG. 22 that a sealing element 6 of essentially annular design, in particular a cord seal, which is produced from at least one material rolled helically parallel to the ring axis A using the method according to the invention is used as flange packing between two flanges 20 and 21. Since this sealing element according to the invention or this cord seal according to the invention is a continuous component, there is no longer any need for a closure area formed by overlapping parts of this cord seal, this naturally being extremely advantageous for practical use. Accordingly the novel sealing elements of the present invention may be incorporated in virtually any sealing application where a continuous seal would be advantageous, including but not limited to, tank or container lids, edge seals for packed columns, and the like.

EXAMPLE

A continuous, biaxially expanded PTFE membrane was produced in accordance with U.S. Pat. Nos. 3,953,566 and 4,187,390. Five strips were cut out of the membrane in the transverse direction, in order to determine the transverse tensile strength of the membrane. The breaking stress was measured using a constant rate-of-jaw separation type machine (Instron testing machine). The following measured values represent averages from the five samples.

| | |
|---|---|
| Length | 16.7 cm |
| Width | 2.7 cm |
| Thickness | 38 μm |
| Weight | 0.0841 g |
| Breaking stress | 21.523 N |

The following values were calculated:

| | |
|---|---|
| Specific density | 0.49 g/cm$^3$ |
| Cross-sectional area | 0.0103 cm$^2$ |
| Tensile strength | 20.5 MPa |

The calculated matrix tensile strength in the transverse direction of the ePTFE membrane was 90 MPa.

To calculate the matrix tensile strength of a porous structure, the breaking stress of the sample is divided by the cross-sectional area thereof, and then this result is multiplied by the ratio of the specific density of the fully compacted polymer to the specific density of the porous polymer. The specific density of fully compacted PTFE was taken to be 2.15 g/cm$^3$.

This ePTFE membrane, measuring 300 mm in width, was manually wound around an aluminum winding mandrel having a diameter of 530 mm so that the total number of 116 horizontal windings was achieved. The wound layers were then rolled along the x-axis of the mandrel. The 300 mm width permitted about 4 helical rotations to form the annular-shaped component. The edge was cut at about α=20° (see FIG. 19). Two rings were made in this manner.

The two resulting rings (Sample 1 and Sample 2) were shrunk/sintered on the mandrel in a convection oven at 385° C. for 30 minutes, in order to achieve a density gradient over the respective ring cross-section, as explained earlier herein.

A third ring (Sample 3) was wound in accordance with the same method and shrunk/sintered at 385° C. for only 18 minutes.

The densities were measured using the "Archimedean principle", i.e. a body is immersed in a liquid of known density (in this case distilled water) and the weight of the water displaced is measured. The weight of the body in air and in the liquid is determined and the density (ρ) calculated in accordance with the following formula:

$$\rho = \frac{W(a) \cdot [\rho_n - 0.0012 \text{g/cm}^3]}{0.99983 \cdot G}$$

where

W(a): weight of the body in air

G: W(a)–W(fl) difference between weight of the body in air and in the liquid 0.99983: correction factor for linkage of the measuring apparatus 0.0012 g/cm$^3$: correction factor for air pressure $\rho_n$: density of the liquid The measurement was carried out using a "Sartorius isoCall AC211S" analytical balance. Density values (g/cm$^3$) were measured in radial layers of about 1.4–1.5 mm thickness from the outer side as far as the core of the seal, the fully compacted core having a diameter of about 4–5 mm in the case of ring Samples 1 and 2. To find the integral density, circular cross-sectional discs with a height of about 2 mm were measured. A fully compacted core was not reached in the case of ring Sample 3:

| Ring Sample | Di (mm) | Dx-s (mm) | Density membrane | Density integral | Density inside | Density outside | Temp/time |
|---|---|---|---|---|---|---|---|
| 1. | 530 | 24.4 | 0.21 | 1.726 | 2.163 | 1.207 | 385° C./30 min. |
| 2. | 530 | 24.8 | 0.20 | 1.711 | 2.159 | 1.152 | 385° C./30 min. |
| 3. | 530 | 25.2 | 0.20 | 1.521 | 1.973 | 0.931 | 385° C./18 min. |

Associated individual densities:

| Radial depth (mm) | Ring 1 | Ring 2 | Ring 3 |
|---|---|---|---|
| 1.5 | 1.207 | 1.151 | 0.931 |
| 3 | 1.362 | 1.268 | 1.124 |
| 4.5 | 1.484 | 1.408 | 1.211 |
| 6 | 1.567 | 1.581 | 1.391 |
| 7.5 | 1.655 | 1.660 | 1.478 |
| 9 | 1.730 | 1.700 | 1.614 |
| 10.5 | 1.785 | 1.774 | 1.811 |
| 10.5–12.5 | 2.162 | 2.159 | 1.973 |

We claim:

1. An endless, self-contained sealing element having a cross-section with a radius and a center, which comprises at least one layer of expanded polytetrafluoroethylene (ePTFE) in the form of a material reel which is rolled-over upon itself, the sealing element having over the radius of the cross-section a density gradient such that the density of the sealing element increases, starting from the outer side of the sealing element towards the center the cross-section.

2. Sealing element according to claim 1, characterized in that the sealing element comprises at least one annular formation (6).

3. Sealing element according to claim 2, characterized in that the first annular formation (6) has an essentially circular cross-section.

4. Sealing element according to claim 3, further comprising a second annular formation whereby a portion of said at least one layer of ePTFE extends from said first annular formation to form a tubular intermediate area connecting said second annular formation to said first annular formation.

5. Sealing element according to claim 4, characterized in that the two annular formations are arranged at a predetermined distance from one another and the tubular intermediate area is additionally laminated with a coating material.

6. Sealing element according to claim 4, characterized in that the two formations of annular shape directly adjoin one another.

7. Sealing element according to claim 1, characterized in that the expanded polytetrafluoroethylene is biaxially oriented.

8. Sealing element according to claim 1, characterized in that the sealing element has a plurality of layers of ePTFE having different properties.

9. Sealing element according to claim 8, characterized in that the sealing element exhibits an asymmetric distribution of the layer properties over the thickness of the cross section.

10. Sealing element according to claim 1, characterized in that the sealing element has at least one coated layer of ePTFE.

11. Sealing element according to claim 10, characterized in that the sealing element has a layer of ePTFE which is coated with a fluorinated ethylene-propylene copolymer (FEP).

12. Sealing element according to claim 10, characterized in that the sealing element has a layer of ePTFE which is coated with a perfluoroalkoxy (PFA).

13. Sealing element according to claim 1, characterized in that the sealing element has a layer of ePTFE which is filled or impregnated with an elastomer.

14. Sealing element according to claim 1, characterized in that the density is about 0.1 g/cm$^3$ in the region of the outer side of the element and the density is at most about 2.2 g/cm$^3$ in the region of the center of the cross-section of the element.

* * * * *